United States Patent Office 2,768,278
Patented Oct. 23, 1956

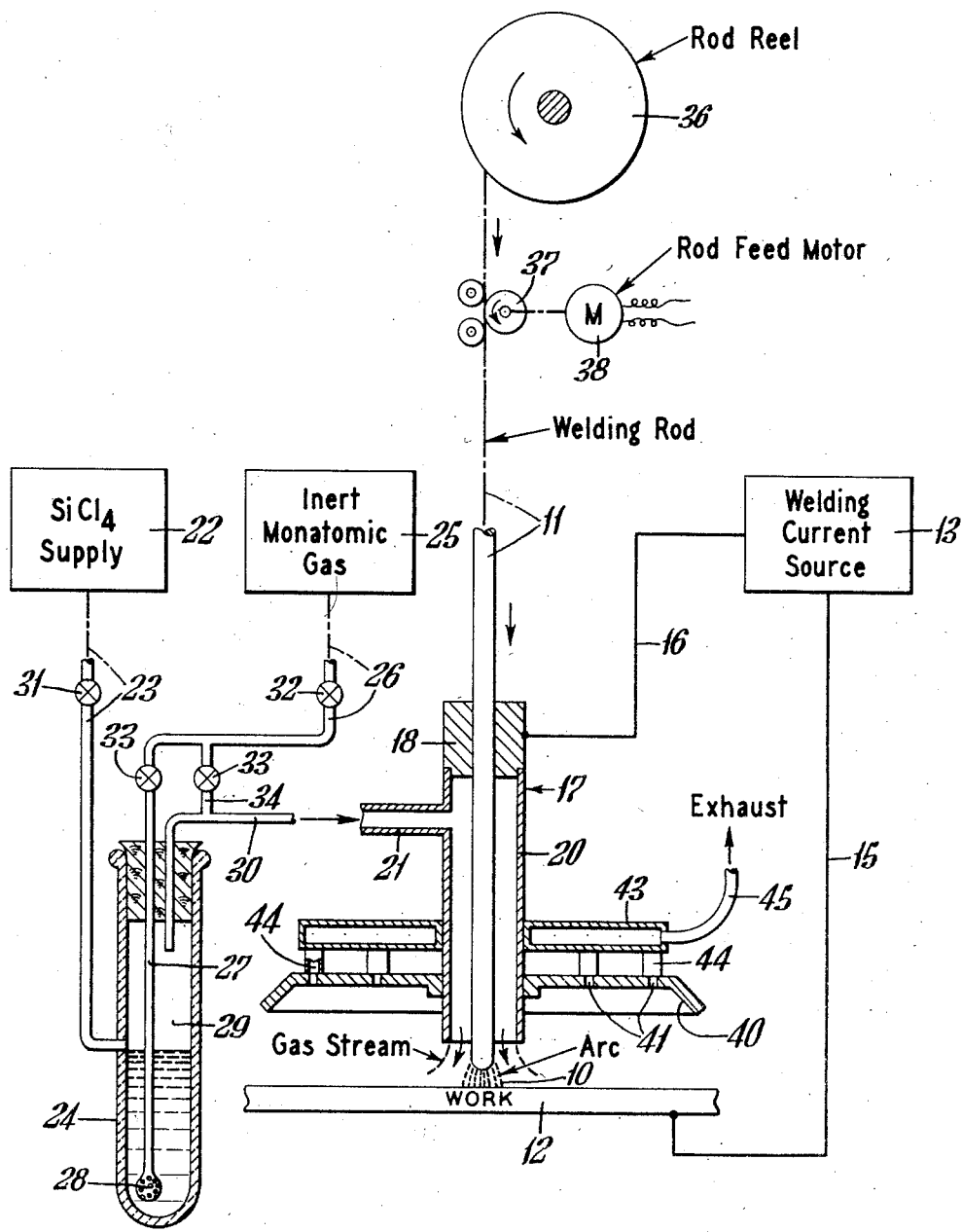

2,768,278

GAS SHIELDED METAL ARC WELDING

John M. Gaines, New York, N. Y., assignor to Union Carbide and Carbon Corporation, a corporation of New York Application June 11, 1954, Serial No. 436,155

6 Claims. (Cl. 219—74)

The present invention relates to gas shielded arc welding and, more particularly, to such electric arc welding process wherein an argon or helium shielding atmosphere is employed.

In consumable electrode gas shielded metal arc welding, it has long been desired to increase the welding speed over that obtainable when employing substantially pure argon and helium shielding gases.

Heretofore, many methods for achieving this result have been attempted, but none has proven completely successful in all respects and all have resulted either in changing the weld bead shape or increasing the porosity of the resultant weld.

It is, therefore, the prime object of the present invention to provide a process of gas shielded metal arc welding which will result in higher welding speeds while still maintaining satisfactory weld bead shapes and negligible porosity.

Other aims and advantages of the present invention will be apparent from the following description and appended claims.

In the drawing, the single figure is a diagrammatic view of consumable electrode metal arc welding apparatus suitable for practicing the process of the invention.

In accordance with the present invention, there is provided an improved inert gas shielded metal arc welding process wherein the arc shielding gas comprises a mixture of inert gas and silicon tetrachloride vapor. The inert gas may consist of any inert monatomic gas, such as helium and argon, or mixtures thereof. Satisfactory welding results have been attained with the addition of up to approximately 20% by volume of silicon tetrachloride vapor to the inert shielding medium.

The drawing sets forth one apparatus for carrying out the process of the present invention. As there shown, an arc 10 is struck between the end of a consumable metal rod 11 and the workpiece 12 which are energized by a welding current source 13 through leads 15 and 16. Lead 16 is connected to welding gun 17 and supplies welding current to the rod 11 through conducting member 18. Lead 15 is connected to workpiece 12 and completes the electric circuit. Concurrently with rod feed, a stream of gas, consisting of a mixture of inert gas and up to 20% by volume silicon tetrachloride vapor, is supplied to gas nozzle 20 of welding gun 17 through conduit 21. This gas shielding medium is discharged from the lower end of gun 17 around consumable welding rod 11 and serves to shield the arc 10 and the weld puddle from the atmosphere during the welding operation.

The gas mixture supplied to conduit 21 of the welding gun 17 is formed externally of the gun. Silicon tetrachloride in the liquid phase is supplied from container 22 through conduit 23 to closed mixing vessel 24 and forms a liquid level in the lower portion of that vessel. Concurrently therewith, an inert monatomic gas, or mixture of such gases, is fed from storage container 25 through conduit 26 to conduit 27 which terminates in perforated bulb 28 below the liquid level of silicon tetrachloride in closed vessel 24. The inert monatomic gas, bubbling up through the silicon tetrachloride liquid and passing through space 29 in vessel 24, mixes with and entrains silicon tetrachloride vapor. The mixture of inert monatomic gas and silicon tetrachloride vapor is passed from closed vessel 24 through conduit 30 to gas inlet conduit 21 of welding gun 17. Valves 31 and 32 are provided in conduits 23 and 26, respectively, to regulate the supply of fluid passing to mixing vessel 24. Valves 33 are provided in conduits 27 and 34 should it be desired to by-pass mixing vessel 24 and supply inert gas to conduit 21 of welding gun 17, or to control the additive at very low concentrations.

At room temperature, it is possible, due to the vapor pressure of silicon tetrachloride, to incorporate up to about 15% by volume of silicon tetrachloride vapor in the inert monatomic gas-silicon tetrachloride vapor mixture, when employing a mixing vessel such as is shown in the drawing. Should a higher percentage by volume of silicon tetrachloride be desired in the mixture, it will be necessary to externally heat the mixing vessel to a temperature greater than room temperature. However, suitable control in the range up to about 15% by volume of silicon tetrachloride in the mixture can readily be obtained employing apparatus such as shown in the drawing.

Welding rod 11 is drawn from a rod reel 36 by roller means 37 which are driven by a motor 38, and the welding rod is fed to the welding gun 17 at a rate coordinated with the rate at which the welding rod is melted and deposited on the work.

It has been found that, when employing a silicon tetrachloride vapor additive to the inert gas shielding medium in accordance with the invention, products from which the operator must be protected are generated at the arc zone. It is believed that HCl and $SiO_2$ are there produced, and it has been found that exhaust apparatus as shown in the drawing satisfactorily removes these reaction products.

As there shown, gas shield 40 is mounted at the lower end of welding gun 17 and envelops the arc zone and weld area. A plurality of ports 41 pass through shield 40 and are connected to manifold line 43 through conduits 44. Conduit 45 connected to manifold line 43 conducts the gases to an exhaust fan and vent.

Other suitable and equivalent means associated with the welding gun may be readily devised for removing from the area the products generated at the weld.

The following table sets forth data, at the highest welding speeds obtainable (at direct current reverse polarity employing a $\frac{1}{16}''$ diameter, No. 32 C. M. S. welding rod and $\frac{1}{8}''$ penetration in $\frac{1}{4}''$ thick carbon steel workpieces) to produce a satisfactory weld, and shows the increase in weld metal deposition rate obtained by the addition of silicon tetrachloride vapor to an argon shielding medium.

Table I

| Shielding Mixture | Max. Welding Speed in I. P. M. | Arc Current at Max. Welding Speed in amps. | Total Gas Flow, C. F. H. | Arc Volt., Volts | Weld. Rod Feed, I. P. M. |
|---|---|---|---|---|---|
| 100% argon | 25 | 300 | 55 | 25 | 280 |
| 10% $SiCl_4$+90% argon | 50 | 380 | 60 | 33 | 300 |
| 15% $SiCl_4$+85% argon | 60 | 450 | 55 | 37 | 360 |

The resultant weld obtained in each case shown in the table was of good contour and contained only negligible porosity. It can be seen from the above data that the addition of a quantity of silicon tetrachloride vapor to the inert shielding gas, up to approximately 20% by volume of the mixture, increases the rod melt-off rate obtainable in the consumable electrode metal arc welding process and simultaneously increases the speed at which a weld can be made while still obtaining good weld quality.

It has been found that the invention is advantageous in the consumable electrode metal arc welding of carbon steels, stainless steels and aluminum.

What is claimed is:

1. In the method of consumable electrode metal arc welding, wherein the arc is established and maintained between said electrode and a workpiece within a shielding atmosphere of a substantially inert gas, the improvement which comprises employing as the shielding atmosphere a mixture consisting essentially of at least an effective amount of silicon tetrachloride vapor in an amount up to approximately 20% by volume and the remainder of inert gas.

2. A process for consumable electrode metal arc welding, wherein an electrode and a workpiece are connected to a source of welding current, comprising establishing an arc between said electrode and said workpiece, concurrently shielding said arc with a mixture consisting essentially of an effective amount of silicon tetrachloride vapor up to approximately 20% by volume and the remainder inert gas, and maintaining said shielded arc while coordinating relative movement between said arc and said workpiece with the rate of fusion of said electrode.

3. In the method of consumable electrode metal arc welding, wherein the arc is established and maintained between said electrode and a workpiece within a shielding atmosphere of a substantially inert gas, the improvement which comprises employing as the shielding atmosphere a mixture consisting essentially of between approximately 5% and 20% by volume of silicon tetrachloride vapor and the remainder of inert gas.

4. A process for consumable electrode metal arc welding, wherein an electrode and a workpiece are connected to a source of welding current, comprising establishing an arc between said electrode and said workpiece, concurrently shielding said arc with a mixture consisting essentially of between approximately 5% and 20% by volume of silicon tetrachloride vapor and the remainder inert gas, and maintaining said shielded arc while coordinating relative movement between said arc and said workpiece with the rate of fusion of said electrode.

5. A process for consumable electrode metal arc welding, wherein an electrode and a workpiece are connected to a source of welding current, comprising establishing an arc between said electrode and said workpiece, feeding said electrode toward said workpiece at a rate coordinated with the rate of fusion of said electrode, concurrently shielding said arc with a mixture consisting essentially of an effective amount of silicon tetrachloride vapor up to approximately 20% by volume and the remainder inert gas, and maintaining said shielded arc while coordinating relative movement between said arc and said workpiece with the rate of fusion of said electrode.

6. A process for consumable electrode metal arc welding, wherein an electrode and a workpiece are connected to a source of welding current, comprising establishing an arc between said electrode and said workpiece, feeding said electrode toward said workpiece at a rate coordinated with the rate of fusion of said electrode, concurrently shielding said arc with a mixture consisting essentially of between approximately 5% and 20% by volume of silicon tetrachloride and the remainder inert gas, and maintaining said shielded arc while coordinating relative movement between said arc and said workpiece with the rate of fusion of said electrode.

References Cited in the file of this patent

UNITED STATES PATENTS 2,576,793    Jordan _____ Nov. 27, 1951